United States Patent
Lyadvinsky et al.

(10) Patent No.: US 10,002,052 B1
(45) Date of Patent: Jun. 19, 2018

(54) SYSTEMS, METHODS, AND COMPUTER PRODUCTS FOR REPLICATION OF DISK SECTORS OF A TARGET MACHINE

(71) Applicants: Maxim V. Lyadvinsky, Moscow (RU); Emil Manukyan, Yerevan (AM); Serguei M. Beloussov, Costa Del Sol (SG); Andrey Dragnev, Moscow (RU)

(72) Inventors: Maxim V. Lyadvinsky, Moscow (RU); Emil Manukyan, Yerevan (AM); Serguei M. Beloussov, Costa Del Sol (SG); Andrey Dragnev, Moscow (RU)

(73) Assignee: Acronis International GmbH, Shaffhausen (CH)

( * ) Notice: Subject to any disclaimer, the term of this patent is extended or adjusted under 35 U.S.C. 154(b) by 1 day.

(21) Appl. No.: 14/320,540

(22) Filed: Jun. 30, 2014

Related U.S. Application Data

(60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
  *G06F 11/14* (2006.01)
  *G06F 11/07* (2006.01)
(52) U.S. Cl.
  CPC ...... *G06F 11/1464* (2013.01); *G06F 11/0757* (2013.01); *G06F 11/1451* (2013.01); *G06F 2201/84* (2013.01)
(58) Field of Classification Search
  CPC ............. G06F 11/1446; G06F 11/1458; G06F 11/1469; G06F 11/0757
  USPC ......................................................... 714/6.3
  See application file for complete search history.

(56) References Cited

U.S. PATENT DOCUMENTS

| | | | |
|---|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |

(Continued)

*Primary Examiner* — Elmira Mehrmanesh
(74) *Attorney, Agent, or Firm* — K&L Gates LLP

(57) ABSTRACT

A method, computer program product, computing system, and system for machine replication are described. The method may include creating a crash-consistent replica of a source machine by replicating sectors from a source drive on the source machine to a target drive on a target machine wherein the sectors on the target drive have the same offset as the sectors on the source drive. The method may further include, in response to determining that a sector replicated from the source drive to the target drive has changed on the source drive, replicating the sector that changed on the source drive to the target drive on the target machine out-of-order. The method may also include creating an application-consistent replica version of the source machine by creating a snapshot of the source machine and replicating sectors from the snapshot to the target drive on the target machine.

20 Claims, 8 Drawing Sheets

(56) References Cited

U.S. PATENT DOCUMENTS

| | | |
|---|---|---|
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,983 B1 * | 5/2012 | Jernigan ............... G06F 3/061 707/827 |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,990,815 B1 * | 3/2015 | Kalekar ............... G06F 9/45558 711/161 |
| 8,996,830 B1 | 3/2015 | Lyadvinsky et al. |
| 9,128,627 B1 * | 9/2015 | Bachu ................. G06F 3/0641 |
| 2006/0225065 A1 | 10/2006 | Chandhok et al. |
| 2007/0244938 A1 * | 10/2007 | Michael ............... G06F 11/1458 |
| 2007/0260831 A1 * | 11/2007 | Michael ............... G06F 9/4401 711/162 |
| 2010/0011178 A1 | 1/2010 | Feathergill |
| 2011/0252208 A1 * | 10/2011 | Ali ...................... G06F 11/1451 711/162 |
| 2012/0324183 A1 * | 12/2012 | Chiruvolu ........... G06F 11/2038 711/162 |
| 2013/0086347 A1 * | 4/2013 | Liu ...................... G06F 3/0482 711/162 |
| 2014/0365740 A1 * | 12/2014 | Vasilyev ............. G06F 11/1451 711/162 |

* cited by examiner

SYSTEMS, METHODS, AND COMPUTER PRODUCTS FOR REPLICATION OF DISK SECTORS OF A TARGET MACHINE

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: U.S. patent application entitled "Configuring Backup and Recovery Routines in a Cloud Environment" and having Ser. No. 14/320,393, filed on Jun. 30, 2014; U.S. patent application entitled "Using A Storage Path To Facilitate Disaster Recovery" and having Ser. No. 14/320,409, filed on Jun. 30, 2014; U.S. patent application entitled "Granular Recovery Using Hot-Plug Virtual Disks" and having Ser. No. 14/320,422, filed on Jun. 30, 2014; U.S. patent application entitled "Hot Recovery of Virtual Machines" and having Ser. No. 14/320,450, filed on Jun. 30, 2014; U.S. patent application entitled "Snapshotless Backup" and having Ser. No. 14/320,496, filed on Jun. 30, 2014; U.S. patent application entitled "Recovery of Virtual Machine Files Using Disk Attachment" and having Ser. No. 14/320,510, filed on Jun. 30, 2014; U.S. patent application entitled "Agentless File Backup of a Virtual Machine" and having Ser. No. 14/320,526, filed on Jun. 30, 2014; U.S. patent application entitled "Data Backup Parallelization" and having Ser. No. 14/320,546, filed on Jun. 30, 2014; and U.S. patent application entitled "Systems and Methods for Backup of Virtual Machines" and having Ser. No. 14/320,555, filed on Jun. 30, 2014.

TECHNICAL FIELD

The technical field may generally relate to replication and recovery of physical and virtual machines.

BACKGROUND

Physical and virtual machines may run business critical applications. Businesses may rely on continuous availability of these applications and any downtime may be unacceptable. When the physical and/or virtual machine running a business critical application fails, immediate recovery of the physical or virtual machine may be necessary to maintain normal business operations. In some situations, services provided by the physical or virtual machine running the business critical application may be unavailable while the physical or virtual machine is being recovered after failure. Accordingly, reducing the time between the failure of a physical or virtual machine and the recovery of the machine may be a primary goal in various business contexts.

BRIEF SUMMARY

In an embodiment, a method for machine replication may include creating a crash-consistent replica of a source machine by replicating sectors from a source drive on the source machine to a target drive on a target machine. The method may further include, in response to determining that a sector replicated from the source drive to the target drive has changed on the source drive, replicating the sector that changed on the source drive to the target drive on the target machine out-of-order. The method may also include creating an application-consistent replica version of the source machine by creating a snapshot of the source machine and replicating sectors from the snapshot to the target drive on the target machine. The method may additionally include, in response to determining that a sector from the source drive on the source machine changed after the snapshot was created, replicating the sector that changed on the source drive on the source machine after the snapshot was created to the target drive on the target machine out-of-order.

One or more of the following features may be included. The method may include integrating one or more hardware drivers at the target machine wherein the one or more hardware drivers correspond to hardware used by the target machine to boot at least one of: the crash-consistent replica and the application consistent replica version of the source machine. The method may further include generating a marker code indicating that all sectors of the source drive on the source machine have been replicated from source drive to the target drive of the target machine and transmitting the marker code to the target machine. The method may also include continuously replicating the source drive of the source machine to the target drive of the target machine in a sector-by-sector mode. The method may additionally include establishing a heartbeat signal between the source machine and the target machine. Moreover, the method may include, in response to determining that the heartbeat signal timed-out, re-creating the crash-consistent replica of the source machine. The method may further include receiving an indication to boot at least one of: the crash-consistent replica and the application consistent replica version of the source machine at the target machine. The sectors on the target drive may have the same offset as the sectors on the source drive.

In an embodiment, a computer program product may reside on a computer readable storage medium and may have a plurality of instructions stored on it. When executed by a processor, the instructions may cause the processor to perform operations for machine replication. The operations may include creating a crash-consistent replica of a source machine by replicating sectors from a source drive on the source machine to a target drive on a target machine. The operations may further include, in response to determining that a sector replicated from the source drive to the target drive has changed on the source drive, replicating the sector that changed on the source drive to the target drive on the target machine out-of-order. The operations may also include creating an application-consistent replica version of the source machine by creating a snapshot of the source machine and replicating sectors from the snapshot to the target drive on the target machine. The operations may additionally include, in response to determining that a sector from the source drive on the source machine changed after the snapshot was created, replicating the sector that changed on the source drive on the source machine after the snapshot was created to the target drive on the target machine out-of-order.

One or more of the following features may be included. The operations may include integrating one or more hardware drivers at the target machine wherein the one or more hardware drivers correspond to hardware used by the target machine to boot at least one of: the crash-consistent replica and the application consistent replica version of the source machine. The operations may further include generating a marker code indicating that all sectors of the source drive on the source machine have been replicated from source drive to the target drive of the target machine and transmitting the marker code to the target machine. The operations may also include continuously replicating the source drive of the source machine to the target drive of the target machine in a sector-by-sector mode. The operations may additionally include establishing a heartbeat signal between the source machine and the target machine. Moreover, the operations may include, in response to determining that the heartbeat signal timed-out, re-creating the crash-consistent replica of the source machine. The operations may further include receiving an indication to boot at least one of: the crash-consistent replica and the application consistent replica version of the source machine at the target machine. The sectors on the target drive may have the same offset as the sectors on the source drive.

In an embodiment, a computing system for machine replication may include one or more processors. The one or more processors may be configured to create a crash-consistent replica of a source machine by replicating sectors from a source drive on the source machine to a target drive on a target machine. The one or more processors may be further configured to, in response to determining that a sector replicated from the source drive to the target drive has changed or that the sector will be changed in response to a write request on the source drive, replicating the content of the sector on the source drive to the target drive on the target machine out-of-order. The one or more processors may also be further configured to create an application-consistent replica version of the source machine by creating a snapshot of the source machine and replicating sectors from the snapshot to the target drive on the target machine. The one or more processors may be additionally configured to, in response to determining that a sector from the source drive on the source machine changed after the snapshot was created, replicate the sector that changed on the source drive on the source machine after the snapshot was created to the target drive on the target machine out-of-order.

One or more of the following features may be included. The one or more processors may be configured to integrate one or more hardware drivers at the target machine wherein the one or more hardware drivers correspond to hardware used by the target machine to boot at least one of: the crash-consistent replica and the application consistent replica version of the source machine. The one or more processors may be further configured to generate a marker code indicating that all sectors of the source drive on the source machine have been replicated from source drive to the target drive of the target machine and transmitting the marker code to the target machine. The one or more processors may also be further configured to continuously replicate the source drive of the source machine to the target drive of the target machine in a sector-by-sector mode. The one or more processors may additionally be further configured to establish a heartbeat signal between the source machine and the target machine. Moreover, the one or more processors may be configured to, in response to determining that the heartbeat signal timed-out, re-create the crash-consistent replica of the source machine. The one or more processors may be further configured to receive an indication to boot at least one of: the crash-consistent replica and the application consistent replica version of the source machine at the target machine. The sectors on the target drive may have the same offset as the sectors on the source drive.

In an embodiment, a system includes a source machine. The source machine may include a source drive, the source machine running an application. The system may include a target machine including a target drive. The system may include a computing device running a replication application for replicating sectors from the source drive on the source machine to the target drive on the target machine. In an embodiment, the sectors on the target drive may have the same offset as the sectors on the source drive.

In part, the disclosure relates to systems and methods to restore a source machine on a target machine. This restoration occurs immediately after the source machine's failure or within a brief time period. The source machine includes an operating system that includes one or more installed file system filter drivers. The filter driver receives information about the file system and tracks file system changes. In one embodiment, the source machine is replicated to the target machine in sector-to-sector mode. The replication is performed continuously from source machine to target machine. One or more of the filter drivers are used to collect sector changes one-by-one from the source machine's disks. Further, one or more of the filter drivers are used to transfer the data from the sectors of the source machine to the target or replica machine.

In an embodiment, the target machine is replicated in an application consistent mode, wherein on the target machine the sectors are applied one-by-one by the same offset as on the source machine. In an embodiment, when a replication is in progress in a live mode, replication application initiates an operation to create a replica in application consistency mode, a replication driver such as a filter driver on the source machine initiates a snapshot, such as a volume shadow copy snapshot, and waits until all application volume shadow copy snapshot writers indicate that the required applications' data is in the snapshot. After the snapshot is created and the replication application receives this information, the replication application makes sure that all information from the hard disk is transferred to the replica/source machine and the target machine's state should be changed to the application-consistent replica/version.

In an embodiment, the operating system of target machine is patched with drivers that connect new target hardware to the target machine, wherein if a portion of data sent to the target machine is absolutely new it is applied on the replica directly to the file system, and if a portion of data sent to the target machine tries to overwrite a non-empty sector, the target machine's driver or another software module performs a set of data storage and transfer operations. This set of operations can include storing the newly transferred portion of data in to a dedicated buffer, saving information from the non-empty sector to the memory storage dedicated to tracking versions. In an embodiment, after the information from the non-empty sector is saved to the storage as a part of the previous version and the portion of data sent from the source becomes written to the replica machine's file system and when all sectors from the source machine are transferred to the target machine, the drivers required for the operating system to boot become integrated into the operating system of the target machine. As a result of this driver integration, if the source machine fails then the target machine immediately boots.

In an embodiment, the target machine boots into the operating system with the active restore driver running as a result of the operating system configuration per the disclosure. The active restore driver generates or accesses a bitmap of sectors stored on the replica storage. As a result, the active restore driver services as a transparent filter for regulating access to the sectors based upon the bitmap. In an embodiment, the active restore driver starts loading sectors from the storage one-by-one, these sectors are stored in the file system on the replica machine and replace the content of the sectors on the replica machine. If an operating system or some application tries to access some sector from the bitmap of sectors stored on the replica storage, the active restore driver loads this sector from the storage out-of-order and replaces the one on the file system with the loaded one. In an embodiment, after sectors stored on the replica storage are written to the corresponding sectors on the file system of the replica machine, the operating system is able to resume normal operation without requiring the active restore driver to perform as an intercessor.

The details of one or more implementations are set forth in the accompanying drawings and the description below. Other features and advantages will become apparent from the description, the drawings, and the claims.

BRIEF DESCRIPTION OF THE DRAWINGS

Various embodiments are described herein by way of example in conjunction with the following figures, wherein.

DETAILED DESCRIPTION

Overview

A cloud provider may institute backup and recovery procedures to ensure persistence of a tenant's applications, data, or other resources accessed through one or more physical or virtual machines. For example, a backup archive or replication version of the physical or virtual machine may be created and stored onsite or offsite and may include the entire content of the physical or virtual machine before it failed. Efficient recovery of physical and virtual machines is critical for proper business operations of the cloud provider as the tenant's application demands are likely to continue in the event of a physical or virtual machine failure.

General backup and recovery workflow may be used to get a physical and/or virtual machine system (and corresponding business applications) up and running after a failure. Upon failure, systems may be recovered from previously created backups. Some recovery processes may be time consuming and, in some situations, may not be acceptable for systems with the low recovery point objectives. Traditional disaster recovery workflows may take too much time and may increase recovery point objectives.

In some situations, users may achieve high availability for physical and virtual machines by implementing a high availability cluster that may allow for switching to a "healthy" machine after a physical or virtual machine fails for some reason. High availability clusters may suffice in some situations, however such clusters may be costly to build since many prerequisites and requirements (e.g., the OS versions on all nodes, the same hardware etc.) may be necessary. Also, if one of the cluster nodes fails, the data on another node may not be guaranteed to be healthy as the cluster system may then be broken. To get the data back, a traditional recovery approach using a previously created backup (if it exists) may eventually be needed.

In view of the forgoing, there may be a need for a system that enables near-immediate availability of the applications and services provided by a physical or virtual machine after failure. In various implementations, the techniques and features described in the present disclosure are directed towards machine replication, which may solve recovery point objectives for users who need to get a failed physical and/or virtual machine system up on another machine almost immediately after its failure. In an implementation, business applications (e.g., Microsoft Exchange Server, Microsoft SQL Server etc.) that are supported by volume shadow copy service (VSS) may be replicated in an application-consistent state. Different point-in-time versions of the replica may be stored and users may be able to roll back to any of the versions, whether they originated from physical or virtual machines.

Figure 1A:
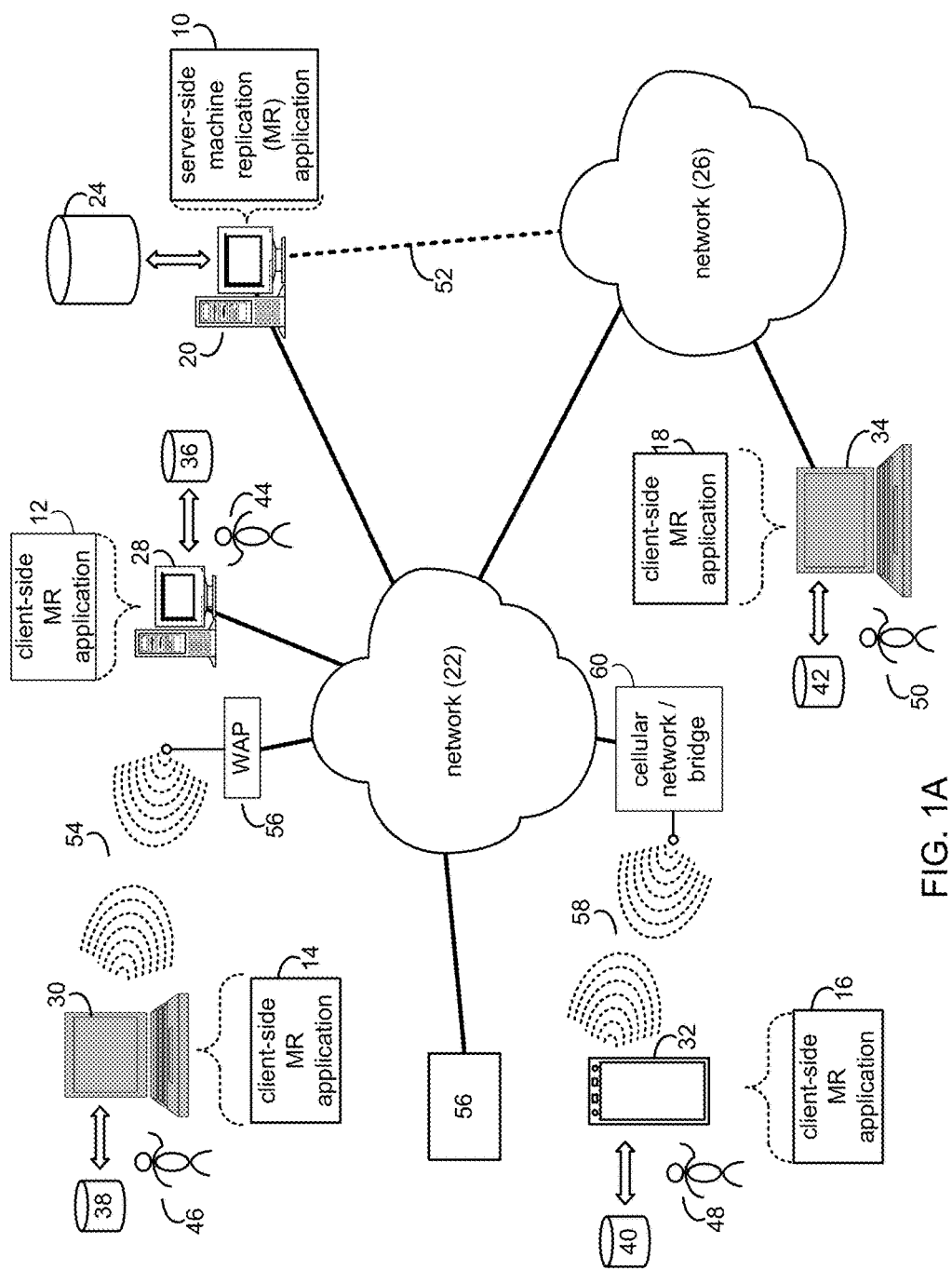
FIG. 1A depicts an example system that can execute implementations of the present disclosure.
Figure 1B:
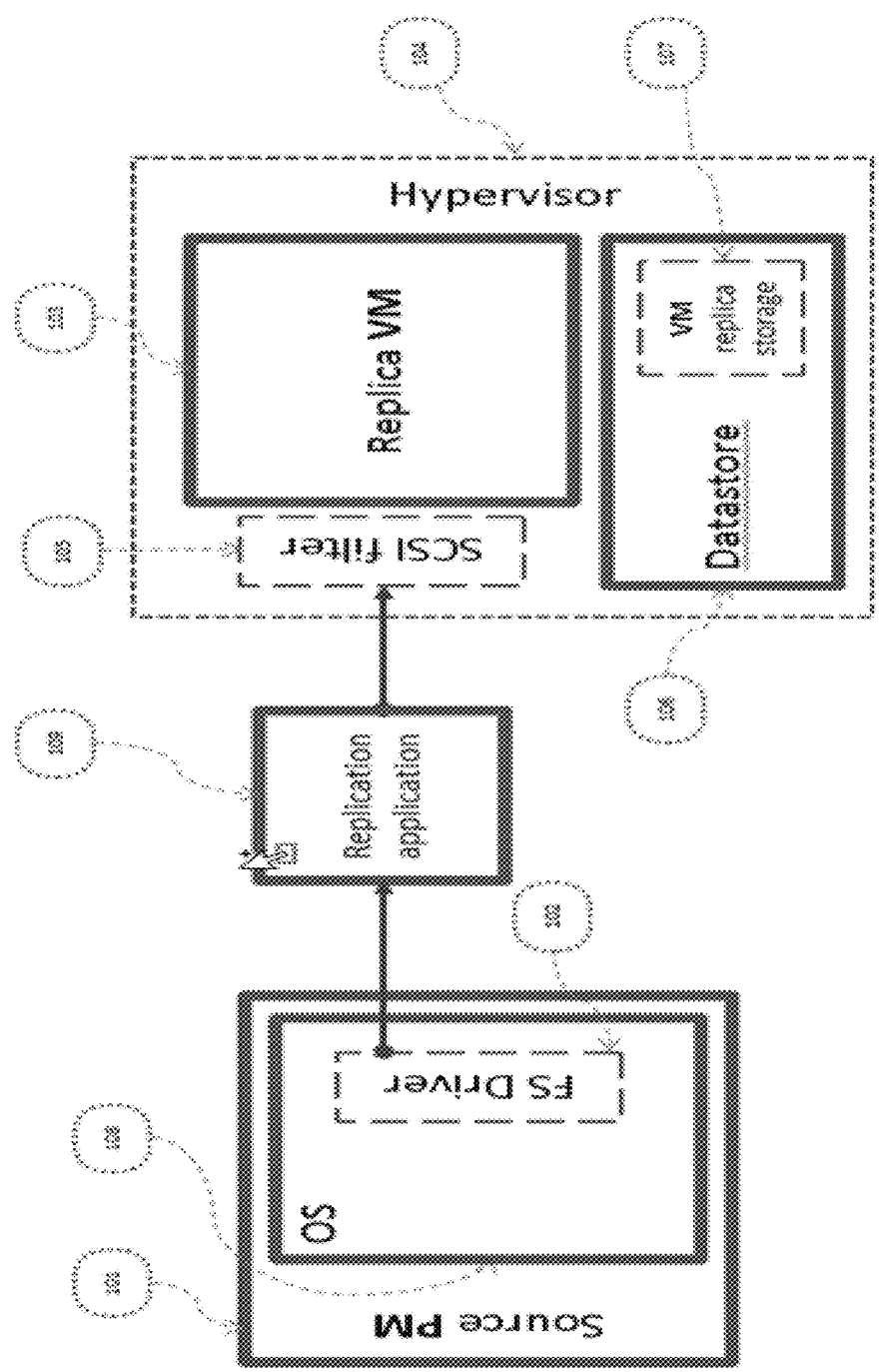
FIG. 1B depicts an example system that can execute implementations of the present disclosure.
Figure 1C:
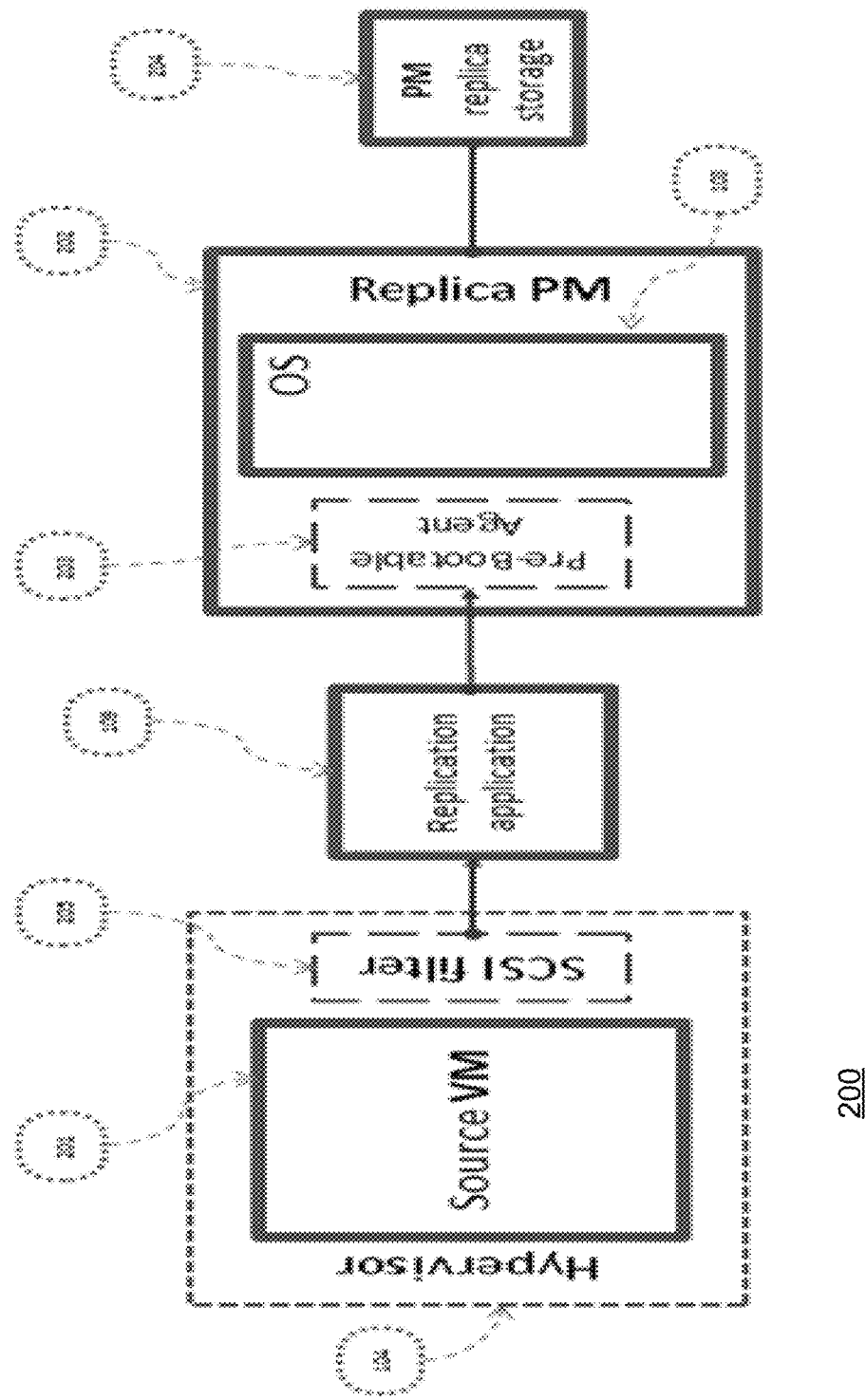
FIG. 1C depicts an example system that can execute implementations of the present disclosure.
Figure 2:
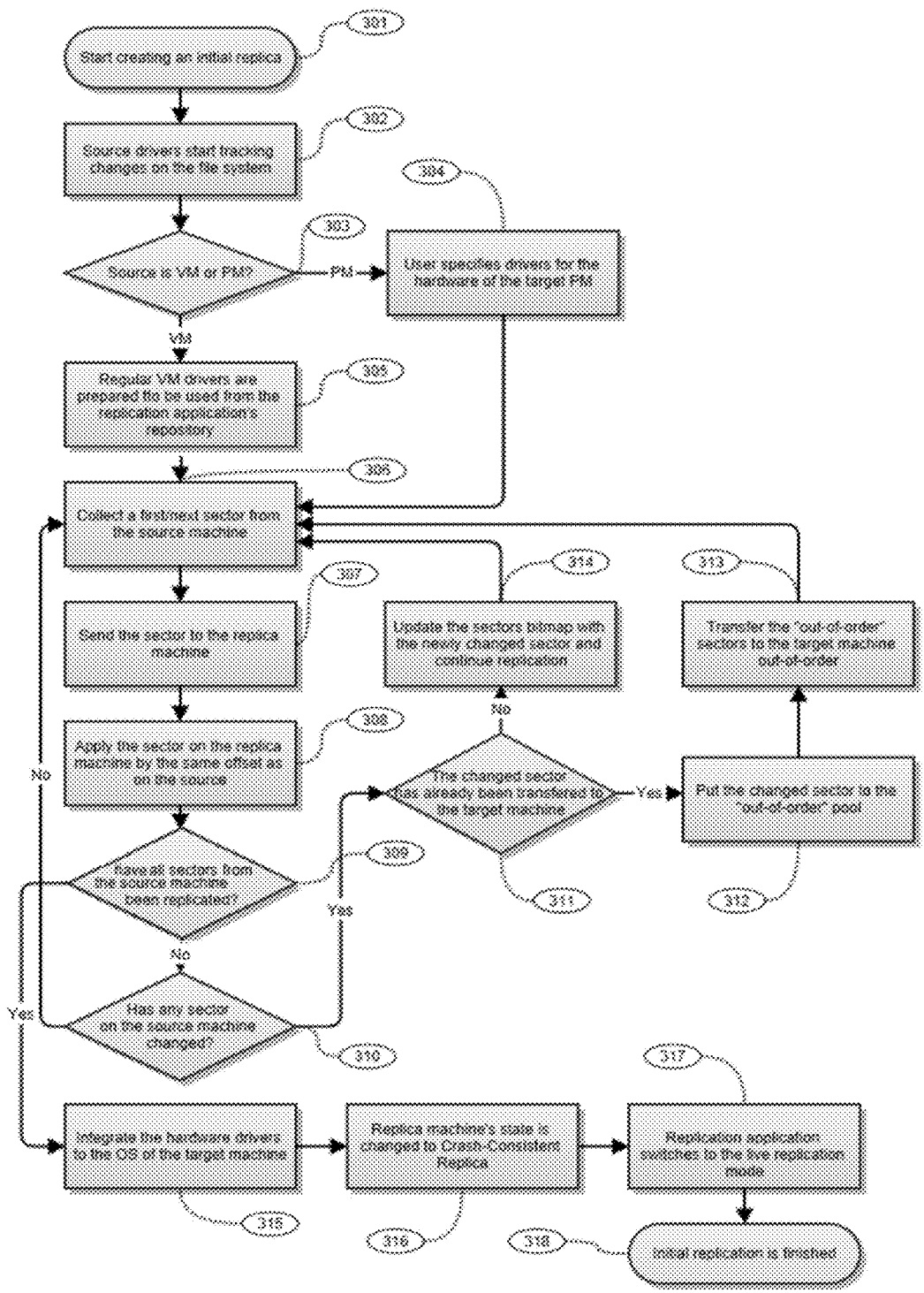
FIG. 2 is a flowchart illustrating an example process for creating a crash-consistent replica in accordance with the present disclosure.

Referring to FIGS. 1 & 2, there is shown a server-side machine replication (MR) 10 and client-side MR applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as machine replication process 10. Further, one or more of client applications 12, 14, 16, and 18 may be referred to as a process configured to carry out one or more of the features described herein, such as machine replication processes 12, 14, 16, and/or 18.

As will be discussed below and referring now to FIG. 6, machine replication process 10 may create 700 a crash-consistent replica of a source machine by replicating sectors from a source drive on the source machine to a target drive on a target machine. Machine replication process 10 may also, in response to determining that a sector replicated from the source drive to the target drive has changed on the source drive, replicate 702 the sector that changed on the source drive to the target drive on the target machine out-of-order. Machine replication process 10 may further create 704 an application-consistent replica version of the source machine by creating a snapshot of the source machine and replicating sectors from the snapshot to the target drive on the target machine. Machine replication process 10 may additionally, in response to determining that a sector from the source drive on the source machine changed after the snapshot was created, replicate 706 the sector that changed on the source drive on the source machine after the snapshot was created to the target drive on the target machine out-of-order.

The machine replication process may be a server-side process (e.g., server-side machine replication process 10), a client-side process (e.g., client-side machine replication process 12, client-side machine replication process 14, client-side machine replication process 16, or client-side machine replication process 18), or a hybrid server-side/client-side process (e.g., a combination of server-side machine replication process 10 and one or more of client-side machine replication processes 12, 14, 16, 18).

System Overview

Referring to FIG. 1A, server-side machine replication process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially.

For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side machine replication process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side machine replication processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side machine replication processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side machine replication processes 12, 14, 16, 18 and/or server-side machine replication process 10 may be processes that run within (i.e., are part of) a cloud computing site, cloud computing application, cloud platform, or cloud environment. Alternatively, client-side machine replication processes 12, 14, 16, 18 and/or server-side machine replication process 10 may be stand-alone applications that work in conjunction with the cloud computing site, cloud computing application, cloud platform, or cloud environment. One or more of client-side machine replication processes 12, 14, 16, 18 and server-side machine replication process 10 may interface with each other (via network 22 and/or network 26).

Users 44, 46, 48, 50 may access server-side machine replication process 10 directly through the device on which the client-side machine replication process (e.g., client-side machine replication processes 12, 14, 16, 18) is executed, namely client electronic devices 28, 30, 32, 34, for example. Users 44, 46, 48, 50 may access server-side machine replication process 10 directly through network 22 and/or through secondary network 26. Further, server computer 20 (i.e., the computer that executes server-side machine replication process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22.

WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Machine Replication Process

For the following discussion, server-side machine replication process 10 will be described for illustrative purposes and server computer 20 may run server-side machine replication application 10 to carry out some or all of the techniques and features described here. It should be noted that server-side machine replication process 10 may interact with client-side machine replication process 12 and may be executed within one or more applications that allow for communication with client-side machine replication process 12. However, this is not intended to be a limitation of this disclosure, as other configurations are possible (e.g., stand-alone, client-side machine replication processes and/or stand-alone server-side machine replication processes). For example, some implementations may include one or more of client-side machine replication processes 12, 14, 16, 18 in place of or in addition to server-side machine replication process 10.

The systems and methods (e.g., machine replication process 10) described herein relate to the recovery of physical and/or virtual machines. In part, the systems and methods relate to decreasing the recovery time period for restoring a physical or virtual machine and, more specifically, retaining availability of the physical or virtual machine upon its failure. The techniques and features described herein may reduce the recovery time period for the physical or virtual machine or decrease or eliminate the time during which services supported by the physical or virtual machine are unavailable. Such a period of unavailability can be reduced or eliminated compared to the conventional time period for transferring all the physical or virtual machine data from the backup archive back to the physical or virtual machine for recovery during a conventional recovery process.

The systems described herein may include one or more memory elements for backup of software and databases, physical machines, virtual machines, and computer storage products including instructions to be executed by a processor to cause the processor to implement the methods described herein.

Referring now to FIG. 1A, one or more of users 44, 46, 48, and 50 may be cloud administrators at a cloud provider or may be cloud end-users. Referring now also to FIGS. 1B and 1C, the cloud administrators may access and administer cloud computing site 100 and/or cloud computing site 200 and the cloud-end users may access and interact with cloud computing sites 100 and/or 200 through one or more of server computer 20 or client electronic devices 28, 30, 32, 34 (respectively). Replication application 109 as shown in FIGS. 1B and 1C may represent one or more of server-side machine replication application 10 and client-side machine replication applications 12, 14, 16, and 18.

In an embodiment, cloud computing sites 100 and/or 200 may include physical and/or virtual machines (e.g., physical machine (PM) 101 or virtual machine (VM) 201). For example, cloud computing site 200 may include virtual machine 201, which may run a cloud or virtualization application such as VMWare™ or may include bare-metal embedded hypervisors (e.g., hypervisor 104, VMware™ ESX™ and VMware™ ESXi™). Further, cloud computing site 200 may include a vCloud™ architecture that may enhance cooperation between hypervisors. Machine replication process 10 (e.g., replication application 109) may run at cloud computing site 100 or 200 and may include any number of the techniques or features described herein.

Hypervisor 104 may be an ESXi host and may run the VMware™ ESXi™ hypervisor and may use a cluster file system such as Virtual Machine File System (VMFS) or a Network File System (NFS).

Machine replication process 10 may replicate a source machine to a target machine, which may also be referred to as a replica machine. Various configurations of physical and virtual machines are possible. For example, the source machine may be a virtual machine (e.g., virtual machine 201 as shown in FIG. 1C) or a physical machine (e.g., physical machine 101 as shown in FIG. 1B). Further, the target machine may be a virtual machine (e.g., virtual machine 103 as shown in FIG. 1B) or a physical machine (e.g., physical machine 202 as shown in FIG. 1C). While not shown, both the source machine and the target (replica) machine may be physical machines and both source machine and target (replica) machine may be virtual machines.

The source machine (either physical or virtual) may be the machine that runs, for example, business critical applications that need to be available almost immediately upon failure. The target or replica machine (either physical or virtual) may be the machine that runs a replica or replica version of the source machine such that the business critical applications are available almost immediately upon failure of the source machine.

Physical source machine 101 may run an operating system 108 which may include a file system (FS) driver 102. File system driver 102 may track file system changes and may also be referred to as a replication driver. File system driver 102 may be installed on physical machine 101.

Hypervisor 104 which may run replica virtual machine 103 or source virtual machine 201 may include a virtual small computer system interface (SCSI) filter 105 or 205. For example, hypervisor 104 may include a virtual SCSI (vSCSI) layer which may be a subsystem of hypervisor 104 and may enable running a vSCSI filter on hypervisor 104. File system driver 102 may be implemented with the vSCSI layer or vSCSI filter 105 and may be configured to act as a transport layer to send (non-virtual) SCSI data to a virtual machine (e.g., virtual machine 103). The virtual machine can then act or operate on the SCSI data and can capture read and write operations sent through the file system driver and vSCSI filter. vSCSI filter 105 may be installed on hypervisor 104 and may allow for high performance reading and writing of SCSI blocks by virtual machine 103. The vSCSI filter may be configured to capture input, output, read, or write requests to and from a virtual disk.

Small computer system interface or (SCSI) may be a standard that defines how computers can communicate with other devices, such as printers, scanners, and storage devices. By using SCSI, computers can send and receive information to and from other SCSI devices. Similarly, a vSCSI layer may enable a virtual machine to communicate with SCSI devices. For example, the vSCSI layer may allow a virtual machine running on a hypervisor to communicate with a SCSI device such as a physical storage disk or drive.

The target or replica machine (e.g., replica virtual machine 103 or replica physical machine 202) may be offline and may be unable to boot into the operating system (e.g., OS 108). As such, the target or replica machine may include a drive configured to write or otherwise transfer replicated sectors from the source machine into the target machine's file system. For example, a target physical machine (e.g., physical machine 202) may include pre-bootable agent 203 which may be configured to handle operation without booting into OS 108. The pre-bootable agent may be based on a Linux OS. A small Linux-based agent may boot in a small OS and perform the same or similar actions as a full Agent in Windows. The pre-bootable agent may be based on other operating systems besides Linux such as WinPE, BartPE, or others.

A virtual target or replica machine (e.g., virtual target machine 103) may use the vSCSI filter 105 to write or otherwise transfer replicated sectors from the source machine into the virtual target machine's file system. The vSCSI filter may be a low-level driver that has access to the virtual machine's (e.g., virtual target machine 103) file system sectors. Thus, any changes in the source machine's (e.g., physical source machine 101) file system may be applied to the target machine's (e.g., virtual target machine 103) file system by using the vSCSI filter. The vSCSI filter can be implemented as a driver which an example of a filter driver.

Replication application 109 may include features and may run processes similar or identical to machine replication process 10. Replication application 109 may manage the operations between the source machine (e.g., physical source machine 101 or virtual source machine 201) and target machine (e.g., virtual target machine 103 or physical target machine 202). Replication application 109 may run on a machine other than the source machine or the target machine, such as server computer 20 or one or more of client electronic devices 28, 30, 32, 34. Replication application 109 may be an intercessor between these the source machine and the target machine.

Replication application 109 may include a software component, executable code, function, subroutine, or other set of instructions designed to carry out one or more operations for machine replication. Replication application 109 may coordinate the machine replication process and may require a separate machine where it can be run. This machine may be, for example, a virtual appliance, a Windows/Linux virtual machine, or a Windows/Linux physical machine, where the executable code of replication application 109 can be executed. Replication application 109 may generally be active during the whole machine replication procedure. Replication application 109 may generally be in communication with the source machine (e.g., physical source machine 101 or virtual source machine 201) and the target machine (e.g., virtual target machine 103 or physical target machine 202) throughout the machine replication process (i.e., machine replication process 10).

In an embodiment, a system for machine replication may include version storage, which may include hard drive 204. For example, hard drive 204 may be a replica storage device in communication with physical target machine 202. For a virtual target machine (e.g., virtual target machine 103), version storage may include a dedicated memory storage in the hosting hypervisor (e.g., hypervisor 104) such as dedicated storage 107, which may be replica storage for the virtual target machine. Dedicated storage 107 may reside in datastore 106 of hypervisor 104.

In an embodiment, a user may initiate replication of the source machine (e.g., physical source machine 101 or virtual source machine 201) to the target machine (e.g., virtual target machine 103 or physical target machine 202). The user (e.g., one or more of users 44, 46, 48, and 50) may initiate replication via a graphical user interface and may specify what machine to replicate and where to store replication versions.

Replication application 109 may create an initial replica of the source machine (e.g., physical source machine 101 or virtual source machine 201) on the target machine (e.g., virtual target machine 103 or physical target machine 202). Replication application 109 may switch to live replication mode. Live replication mode means that replication application 109 may continue to track changes on the source machine (e.g., physical source machine 101 or virtual source machine 201) and may continue transferring and applying the changes to the target machine (e.g., virtual target machine 103 or physical target machine 202) on the fly. The replica may be in an inconsistent state at this time.

In an embodiment, physical source machine file system driver 102 may intercept or continually intercept write operations directed to one or more hard disks of source physical machine 101, and may track changes to the file system of source physical machine 101 on the fly. Further, in an embodiment, vSCSI filter 205 may intercept or continually intercept write operations directed to one or more hard disks of virtual source machine 201, and may track changes to the file system of virtual source machine 201 on the fly. File system driver 102 and vSCSI filter 205 may be referred to herein as source machine drivers 102 or 205.

Source machine drivers 102 or 205 may provide changes blocks and corresponding metadata (e.g., sector number and related details) to replication application 109 that may perform the replication or continuous replication. As discussed above, replication application 109 may be an intercessor between the source machine and the target or replica machine during replication. Replication application 109 may receive information via a graphical user interface though which a user may select replication-related operations to run. Replication application 109 may receive changes from the source machine and may direct the changes to the target or replica machine. Replication application 109 may also store replication task properties. The replication application may manage operations that perform the techniques and features described in the present disclosure and may allow for communications between the source machine and the replica machine, which otherwise may be two independent machines. When a replication task is created in the replication application, replication task properties including what to replicate, where to replicate, and how to replicate may be specified.

Replication application 109 may transfer the changes from the source machine to target machine drivers 105 or 203. vSCSI filter 105 and pre-bootable agent 203 may be installed on the virtual target machine or physical target machine, respectively, may be referred to as target machine drivers 105 or 203. The source machine (e.g., physical source machine 101 or virtual source machine 201) may mark this portion of the source machine data (i.e., the changed portion) as sent. The target machine's (e.g., virtual target machine 103 or physical target machine 202) driver (e.g. target machine drivers 105 or 203) may apply the transferred changes to the sectors of the target drive by the same offset as on the source machine (e.g., physical source machine 101 or virtual source machine 201).

In turn, the target (or replica) machine (e.g., virtual target machine 103 or physical target machine 202) may report to the source machine (e.g., physical source machine 101 or virtual source machine 201) via replication application 109 that the changed data has been applied to the target machine. Further, the source machine (e.g., physical source machine 101 or virtual source machine 201) may mark this portion of data (i.e., the changed portion) as sent and received.

The target (or replica) machine (e.g., virtual target machine 103 or physical target machine 202) may now be in a crash-consistent state. For example, business applications such as MS SQL and MS Exchange may be in a state similar to where a computer running the business application unexpectedly shuts down. For example, if there is a server running MS Exchange and the server unexpectedly shut down (e.g. due to a power failure), such situation may result in a crush-consistent state. In some situations MS Exchange may require certain operations to bring it back to an application-consistent state. When the sectors are merely replicated, the resulting replication may be in a crush-consistent state. To get an application-consistent state, a snapshot may be required.

Figure 6:
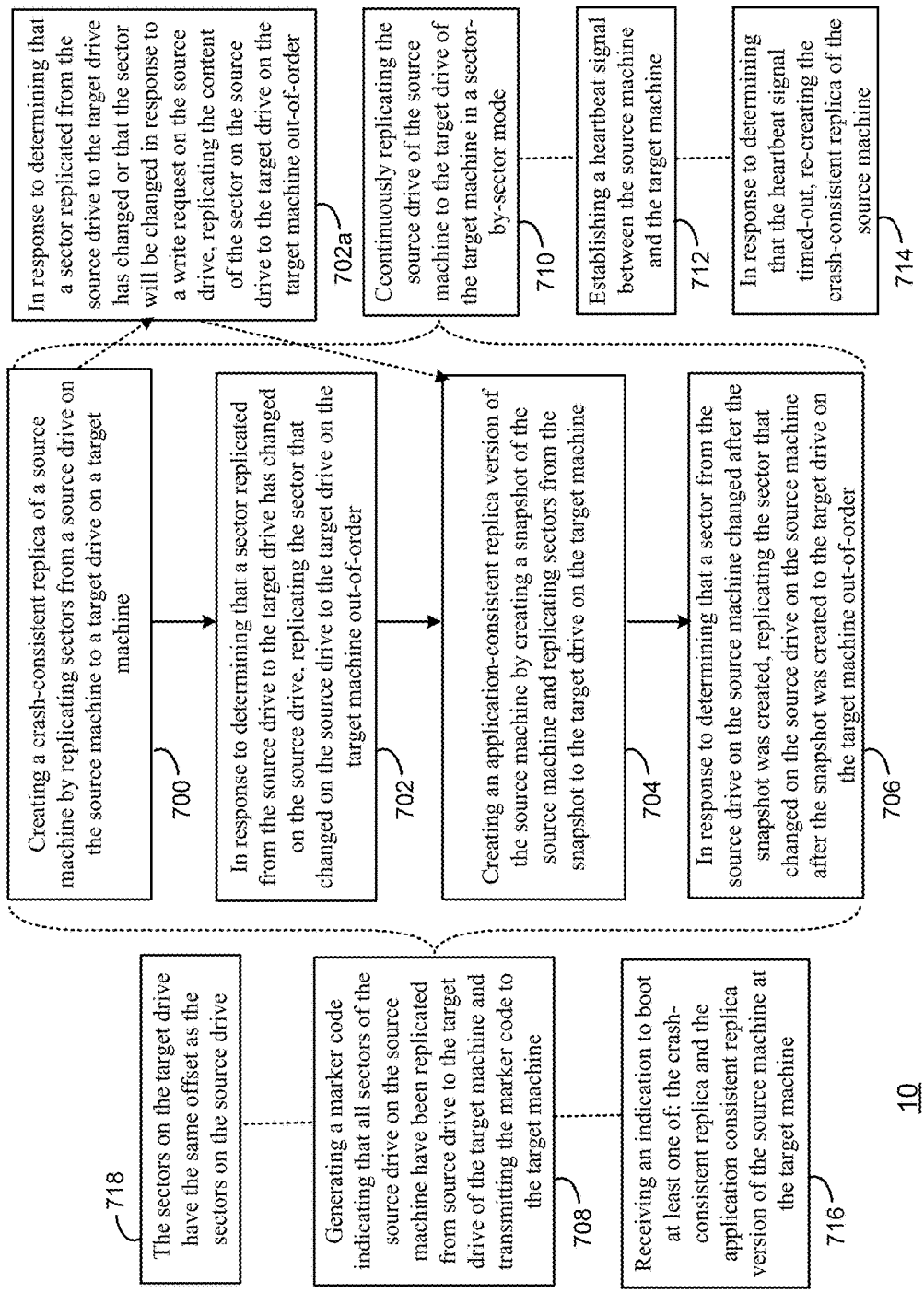
FIG. 6 is a flowchart illustrating an example process for machine replication in accordance with the present disclosure.

Referring now to FIGS. 2 and 6, replication application 109 (e.g., machine replication process 10) may start replication or continuous replication and may create 700 a crash-consistent replica of a source machine by replicating sectors from a source drive on the source machine to a target drive on a target machine. Continuous replication may mean that a set of sectors are changed in the replica shortly after they are changed in the source. The replication process may be split into three phases: (i) initial replication (e.g., a one-time operation): (ii) continuous replication (e.g., an ongoing process), the result of which is the crush-consistent state; and (iii) an application-consistent replica snapshot (e.g., an on demand operation). The sectors on the target drive may have the same offset as the sectors on the source drive. Such sector-to-sector replication means that bytes from a certain sector (e.g., sector 012) at the source drive will be replicated at the same sector (e.g., sector 012) at the target or replica drive. Alternative, when not using sector-to-sector replication, the data from sector 012 may be replicated to any empty sector at the target drive (e.g., sector 147) and may not have the same offset as the sector on the source drive. The source drive on a physical source machine may be a hard drive or other storage device. The source drive on a virtual source machine may be a virtual disk or data store.

For example, hypervisor 104 may include a file system datastore which may be based on VMFS (virtual machine file system). The datastore may include one or more virtual disks which may be a virtual machine disk (VMDK or .vmdk) file. The virtual disk may be a single disk file including the constituent data for an entire virtual machine (e.g., virtual source machine 201). The file system datastore may be a logical representation of the storage provided by hypervisor 104. Physically, the file system datastore may be located on a non-virtual SCSI device in communication with hypervisor 104.

Creating 700 the crash consistent replica of the source machine may include creating (301) an initial replication via an initial replication operation that may be part of replication application 109. When replication or continuous replication starts for the first time, the initial replication application may start. A user or replication application 109 (by schedule) may start the initial replication operation. The target machine's (e.g., virtual target machine 103 or physical target machine 202) state may be marked as inconsistent at this time. This is because the initial replica may be considered application-consistent only when the backup is taken with a snapshot (e.g., VSS) and when an application-consistent replica version is created. The initial replica may copy sectors from the source machine (e.g., physical source machine 101 or virtual source machine 201) to target or replication machine (e.g., virtual target machine 103 or physical target machine 202). Source machine drivers 102 or 205 may start tracking (302) changes on the file system of the source machine (e.g., physical source machine 101 or virtual source machine 201).

Further, replication application 109 may determine (303) which drivers will be required for the target or replication machine's (e.g., virtual target machine 103 or physical target machine 202) hardware to operate. This determination may be based, in part, on whether the source machine is a virtual or physical machine. Replication application 109 may use, for example, Acronis Universal Restore technology, where any missing drivers may be taken from an operating system driver's repository or from a specified location (e.g., network folder, CD/DVD). In the case of a physical target machine (e.g. physical target machine 202), additional drivers may be required if hardware type on the physical target machine is different than hardware on the source machine. Physical machine drivers may be different depending on the hardware vendors, models, etc. In an implementation, a user may provide (304) drivers for the physical target machine's hardware (e.g., HAL, hard drive, RAID controllers, network card(s), etc.).

In the case of a virtual target machine (e.g., virtual target machine 103), virtual machine drivers may be the same because the vendor may be the same and the model may be the same. In general, for example, VMware drivers or other virtual machine drivers may be stored in an accessible driver repository. Common hardware drivers may be used and replication application 109 may not need the user to provide these drivers. The common virtual machine drivers may be prepared (305) to be used from the replication application's (i.e., replication application 109) repository.

Replication application 109 may collect (306) sectors one-by-one from the source machine's (e.g., physical source machine 101 or virtual source machine 201) disks and may transfer or send (307) data from each sector to the target or replication machine (e.g., virtual target machine 103 or physical target machine 202). On the target or replica machine (e.g., virtual target machine 103 or physical target machine 202), the sectors from the source machine may be applied (308) one-by-one by the same offset as the sectors had on the source machine (e.g., physical source machine 101 or virtual source machine 201).

Replication application 109 may determine receive an indication (310) that data or sectors on the source machine (e.g., physical source machine 101 or virtual source machine 201) have changed. For example, a user may have entered or altered data while using a business application during the replication process. Source machine drivers 102 or 205, which may also be referred to as replication drivers 102 or 205, may determine (311) if the changed sector or sectors have already been transferred to the target or replica machine (e.g., virtual target machine 103 or physical target machine 202). In an implementation, target machine drivers 105 or 203 may continuously report to replication application 109 which sectors have already been transferred to the target or replica machine (e.g., virtual target machine 103 or physical target machine 202), as target machine drivers 105 or 203 may apply the changes on the target or replica machine.

Referring now also to FIG. 6, in response to determining 702 that a sector replicated from the source drive to the target drive has changed on the source drive, replication application 109 and/or machine replication process 10 may replicate the sector that changed on the source drive to the target drive on the target machine out-of-order. If the changed sector on the source machine (e.g., physical source machine 101 or virtual source machine 201) has not yet been transferred to the target or replica machine (e.g., virtual target machine 103 or physical target machine 202), an initial replication snapshot may be updated (314). Further, in an implementation, in response to determining that a sector replicated from the source drive to the target drive has changed or that the sector will be changed in response to a write request on the source drive, replication application 109 and/or machine replication process 10 may replicate 702a the content of the sector on the source drive to the target drive on the target machine out-of-order. A sectors bitmap may be updated with the newly changed sectors and replication may continue.

During the initial replication a disk snapshot of the source machine may be created (a VSS snapshot may be created to get an application-consistent version). For example, the initial replication snapshot may be represented by the following table:

| E | X | A | M | P | L | E | — | O | F |
|---|---|---|---|---|---|---|---|---|---|
| — | S | N | A | P | S | H | O | T | |

The data according to this snapshot may be replicated to the target or replica machine (e.g., virtual target machine 103 or physical target machine 202) byte-by-byte. The operating system or user on the source machine (e.g., physical source machine 101 or virtual source machine 201) may decide to change some data on the source machine. For example, the data may be changed from the word "example" to the word "dancing"). It may not be necessary to transfer the word "example" to the target or replica machine, and then subsequently transfer the word "dancing" to the target or replica machine. If we know the sector or sectors that include the "example" data have not yet been transferred to the target or replica machine, replication application 109 may direct this change in the initial replication snapshot itself. As shown in the table below, the initial replication snapshot may be changed to:

| D | A | N | C | I | N | G | — | O | F |
|---|---|---|---|---|---|---|---|---|---|
| — | S | N | A | P | S | H | O | T | |

If the changed sector on the source machine (e.g., physical source machine 101 or virtual source machine 201) has already been transferred to the target or replica machine (e.g., virtual target machine 103 or physical target machine 202), then the changed sector may be placed (312) in an "out-of-order" pool. The data from this changed sector may be transferred (313) to the target or replica machine (e.g., virtual target machine 103 or physical target machine 202) out-of-order. For example, replication application 109 may have already transferred sectors including the following data: "E", "X", and "A". A user or operating system may subsequently change "example" to "dancing". In this situation, data from the sectors that previously included "E", "X", and "A" that now instead include "D", "A", and "N" may be updated on the target or replica machine out-of-order because these sectors with new data may not be included in the initial replication snapshot.

Replication application 109 may determine (309) if all sectors from the source machine (e.g., physical source machine 101 or virtual source machine 201) have been replicated to the target or replica machine (e.g., virtual target machine 103 or physical target machine 202). If all sectors from the source machine have not been replicated to the target or replica machine, replication application 109 may continue to operation 310 and/or operations 306/307.

When all sectors from the source machine have been transferred to the target or replica machine, drivers needed for the operating system to boot on the target or replica machine be integrated (315) into the operating system of the target or replica machine. Once necessary drivers (for e.g., new or different hardware) have been integrated into the operating system of the target or replica machine, the target or replica machine (e.g., virtual target machine 103 or physical target machine 202) may be in a crash-consistent state and replication application 109 may change (316) the state of the target or replica machine to crash-consistent replica.

Replication application 109 may switch (317) to live replication mode (or "live mode"). This means that the replication application 109 may continue tracking changes on the source machine (e.g., physical source machine 101 or virtual source machine 201) and may continue transferring and applying the changes to the target or replica machine (e.g., virtual target machine 103 or physical target machine 202) on the fly. The target or replica machine state may be in an inconsistent mode at this point. The initial replication may be finished (318) at this point.

Continuous (or live) replication may transfer sectors one-by-one. At a particular moment in time, not all sectors may be transferred. If the source ceases to exist at this moment, the replica may not contain all required sectors and may be in an inconsistent state. In some cases, some missing sectors may be fixed or restored by an operating system or other responsible application. However, a live-replicated machine may still be in an inconsistent mode. For business applications such as MS SQL and Exchange, this may also be known as crash-consistent state. An application-consistent version may include all sectors for a particular moment in time.

Figure 3:
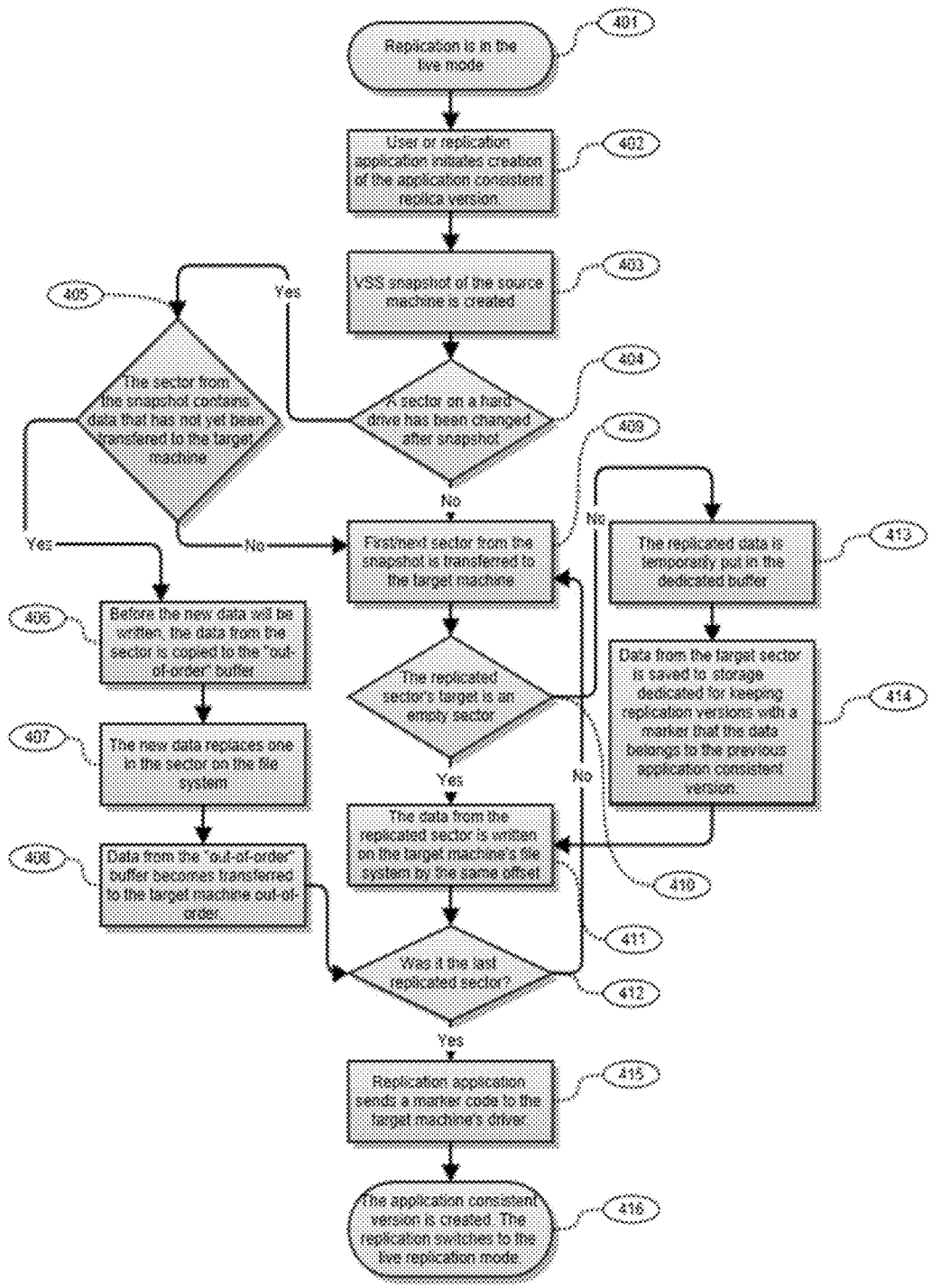
FIG. 3 is a flowchart illustrating an example process for creating an application consistent replica version in accordance with the present disclosure.

Referring now to FIGS. 3 and 6, replication application 109 may create 704 an application-consistent replica version of the source machine (e.g., physical source machine 101 or virtual source machine 201) by creating a snapshot of the source machine and replicating sectors from the snapshot to the target drive on the target machine (e.g., virtual target machine 103 or physical target machine 202). The sectors on the target drive may have the same offset as the sectors on the source drive.

While replication application 109 is in progress in live replication mode (live mode) (401) a user may be happy with the current state of his or her source machine source machine (e.g., physical source machine 101 or virtual source machine 201). The user may wish to have a replica version of the current state in an application-consistency mode. In other words, the user may decide to save this particular source machine's state and create a point-in-time application-consistent replica version of the source machine on the target or replica machine (e.g., virtual target machine 103 or physical target machine 202).

The user or replication application 109 may initiate (402) creation of an application-consistent replica version of the source machine (e.g., physical source machine 101 or virtual source machine 201). Source machine driver 102 or 205 (replication drivers) on the source machine may initiate and create (403) (e.g., via replication application 109) a snapshot (e.g., a VSS snapshot) of the source machine. Each application running on the source machine may include a VSS writer or similar writer which may report that the required or up-to-date application data is included in the snapshot.

For example, the source machine (e.g., physical source machine 101 or virtual source machine 201) may run business applications such as MS SQL or MS Exchange. In order to backup these business applications the application may need to be stopped from running or a snapshot may be created by using a VSS writer supplied by the application. Business applications such as MS SQL and MS Exchange may include VSS writers. The VSS writer may create an application-consistent snapshot that may be used by replication application 109. Data that may usually be kept by the business application in RAM, which may not be captured by a snapshot of a hard disk, may be forcibly pulled down to the hard disk. Thus, a VSS snapshot may include all application data needed by replication application 109. It should be noted that VSS writers and VSS snapshots are discussed for illustrative purposes only, and other writer and snapshot applications may be used to achieve the techniques and features described herein.

After an application-consistent snapshot is created and replication application 109 receives an indication that the required or up-to-date application data from the source machine is included in the snapshot, each sector from the application-consistent snapshot may be transferred (409) to the target or replica machine (e.g., virtual target machine 103 or physical target machine 202). Replication application 109 may confirm that all data from the source machine (e.g., physical source machine 101 or virtual source machine 201) hard disk (source machine drive) is transferred to the target or replica machine and whether the last sector has been transferred (412). Source machine driver 102 or 205 (replication drivers) may receive confirmation the target machine through replication application 109 that each sector has been received and applied at the target machine (i.e., stored on the target machine drive).

Replication application 109 may determine (404) whether a sector on the source drive of the source machine (e.g., physical source machine 101 or virtual source machine 201) has been changed since the snapshot was taken. In response to determining that a sector from the source drive on the source machine changed after the snapshot was created, replication application 109 may replicate (706) the sector that changed on the source drive on the source machine after the snapshot was created to the target drive on the target machine out-of-order. For example, the sector from the snapshot that changed may include data that has not yet been transferred from the source machine to the target machine (405). Before this new data may be transferred, the data from the changed sector may be copied (406) to an out-of-order buffer. The new data may replace (407) the data in the corresponding sector on the file system of the target machine. Accordingly, data from the out-of-order buffer may be transferred (408) to the target machine out-of-order.

When the last sector has been transferred from the source machine to the target machine, replication application 109 may send (415) a special marker code (e.g. a sequence of symbols/bytes) to the target or replica machine (e.g., virtual target machine 103 or physical target machine 202). The special marker code may be a signal for the target or replica machine that any future changes sent from the source machine to the target or replica machine are for the next application-consistent replica version. For example, the next application-consistent replica version of the source machine created may not be created from scratch, but may include incremental changes to one or more application-consistent replica versions previously created. Thus, the special marker code may serve as a control point and all data written on the target or replica machine after this control point may automatically become the application-consistent replica version when the next application-consistent replica version is initiated.

When the application-consistent replica version is requested by a user or by replication application 109, a snapshot (e.g., VSS snapshot) of the source machine may be created and the new portion of data may be replicated to the target or replica machine. The previous data may already be present in a prior application-consistent replica version. For example, data received at the target or replica machine from the source machine starting from the first special marker code may be named or identified in versions storage 107 or 204 as the second application-consistent replica version. Additionally, when the last sector has been transferred from the source machine to the target machine, replication application 109 may change (416) the state of the target or replica machine (e.g., virtual target machine 103 or physical target machine 202) to application-consistent.

Once the new application-consistent replica version has been created, if a portion of data sent to the target or replica machine (e.g., virtual target machine 103 or physical target machine 202) is new (e.g. is written to an empty sector), the portion of data may be applied (411) on target or replica machine directly at the file system with the same offset as the corresponding sector has at the source machine. Further, if target machine drivers 105 or 203 attempt to overwrite a non-empty sector with a portion of data sent to the target or replica machine, the target machine drivers 105 or 203 may put the portion of data into a dedicated buffer (413).

In turn, the data from the non-empty sector may be saved to storage dedicated to storing versions (e.g., versions storage 107 or 204) (414) and the data may be stored with a marker indicating that the data belongs to the previous application-consistent replica version. In other words, the marker may indicate that the application-consistent version created next time may not need to be created from scratch, but may be incremental to the version(s) created before. The marker may act as a control point indicating that all data written on the target machine after the control point may automatically become the application-consistent replica version when this application-consistent version is initiated (402). When the application consistent version is requested by a user or application, a VSS snapshot may be taken and the new portion of data may be replicated to the target machine. The prior data may already be at the target machine and all data on the target machine starting from the marker may be named in versions storage (107) or (204) as version 2. The information from the non-empty sector may be saved to the dedicated storage as a part of the previous application-consistent replica version and the portion of data sent from the source machine may be written to the target or replica machine's file system.

Figure 4:
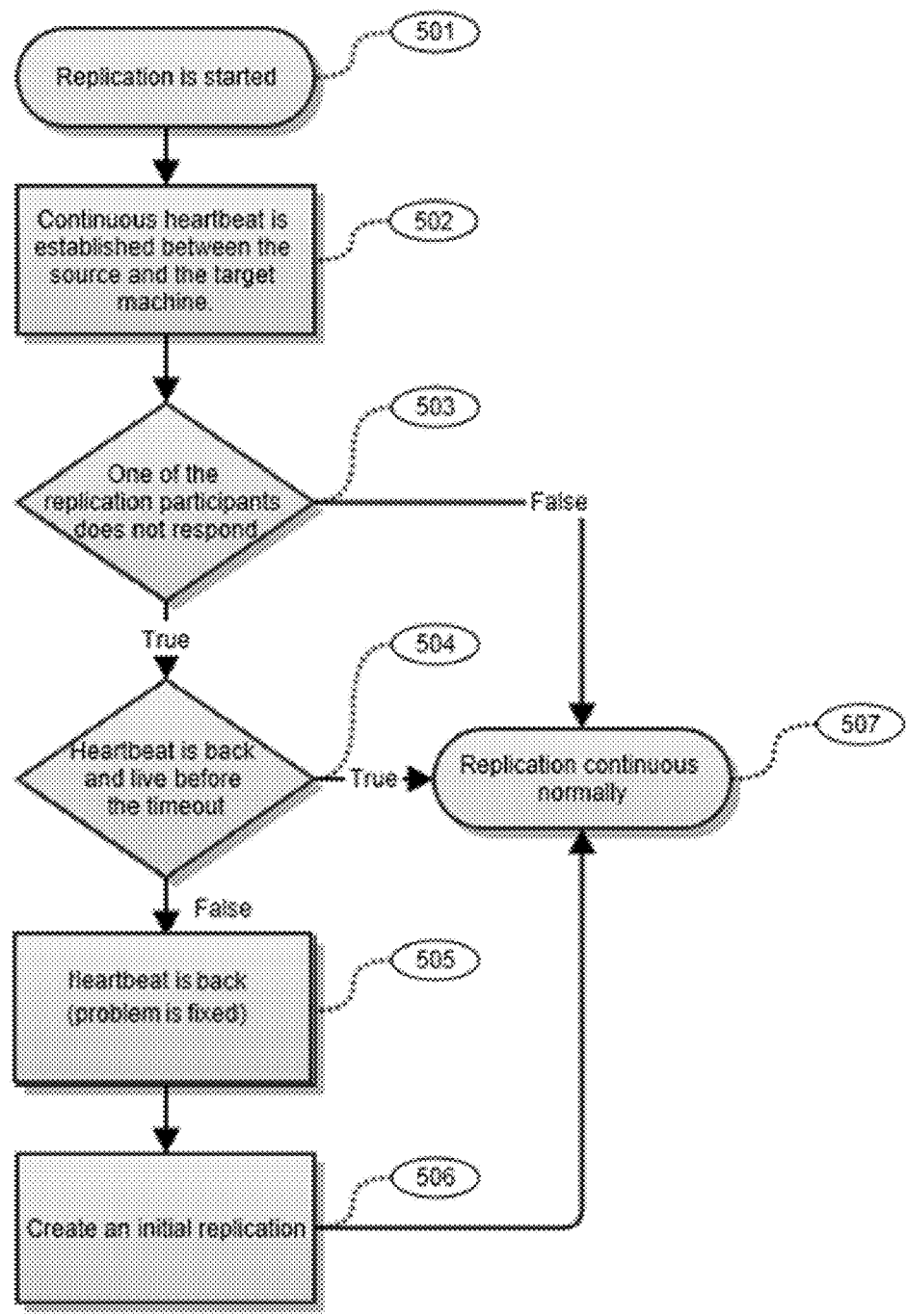
FIG. 4 is a flowchart illustrating an example process for handling problems that may arise during machine replication in accordance with the present disclosure.

Referring now to FIGS. 4 and 6, replication application 109 may establish 712 a heartbeat signal between the source machine and the target machine. The heartbeat signal may allow replication application 109 to determine if problems such as network issues arise during replication. For example, once replication is started (501), a continuous heartbeat signal may be established (502) between the source machine (e.g., physical source machine 101 or virtual source machine 201) and the target or replica machine (e.g., virtual target machine 103 or physical target machine 202).

Some issues that may arise during replication are network connectivity issues, latency, operating system issues, software interference such as antivirus software, denial of write access or locking of the file system on the target machine, network bandwidth issues due to other high-load network jobs running at the same time, network instability due to hardware or software issues, target machine goes offline or is restarted, or reduced performance at the target machine due to hardware and software allocation or utilization. For example, the source machine may be faster than the target machine such that the target machine may not have applied a previous portion of data received from the source machine, and the source machine may continue to transfer new data to the target machine. Any of these issues or other issues may affect the data flow between the source machine and the target machine during replication such that the replication fails.

For example, one of the machines involved in the replication process (e.g., the source machine or target machine) may not respond (503) to the heartbeat signal received from replication application 109. In some situations, the heartbeat signal may return or become live again before a timeout. In other words, the source machine or target machine that failed to ping back to replication application 109 may do so before the timeout, and the replication process may continue normally (507). However, the heartbeat signal may return after the timeout (e.g., after the problem is fixed) (505). In this situation the initial replication may need to be created again (506). Thus, in response to determining that the heartbeat signal timed-out, replication application 109 may re-create (714) the crash-consistent replica of the source machine.

Figure 5:
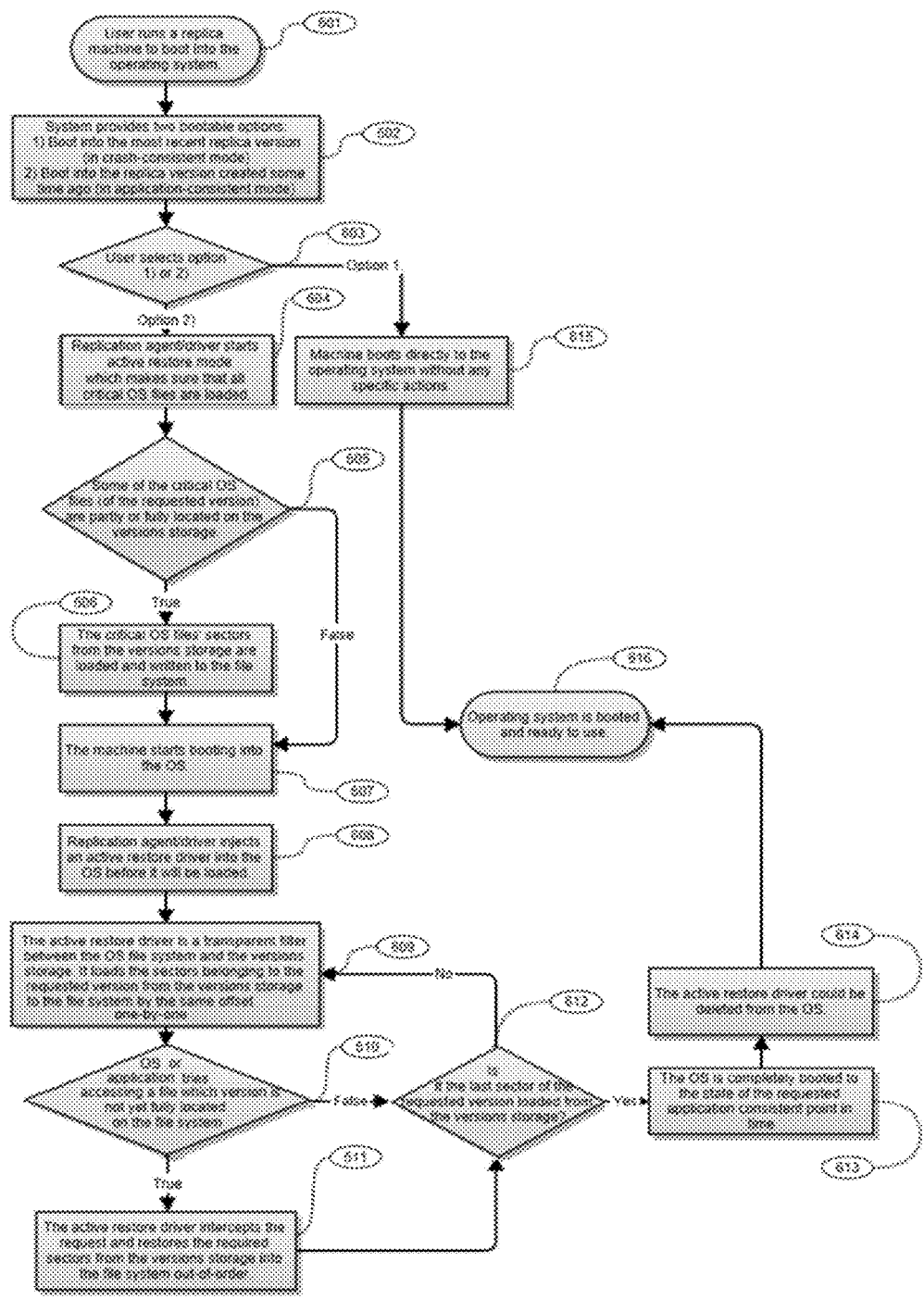
FIG. 5 is a flowchart illustrating an example process for booting a machine replica in accordance with the present disclosure.

The replica machine (e.g., virtual target machine 103 or physical target machine 202) is created so that it can be used in the event of a source machine (e.g., physical source machine 101 or virtual source machine 201) failure. Referring now also to FIGS. 5 and 6, if the source machine fails for some reason (e.g., hardware failure, etc.), the user may boot and run (601) the replica machine. The first boot of the replica machine (e.g., virtual target machine 103 or physical target machine 202) may provide the user with two options (602): boot the most recent replica version (in crash-consistent mode); and (ii) boot a replica version previously created (in application-consistent mode).

If the user selects (603) to boot into the most recent replica version (i.e., option 1), no specific actions may be required from replication application 109 the replica machine may boot (615) to the operating system that has been replicated and the operating system may be booted and become ready to use (616). The user may run one or more utilities that may be supplied with business applications such as Microsoft Exchange Server or Microsoft SQL Server to fix any application problems or issues.

If the user selects (603) to boot into a previous replica version in application-consistent mode (i.e., option 2), the target machine drivers (replication drivers) 105 or 203 may embed into the replica machine's (e.g., virtual target machine 103 or physical target machine 202) operating system a file system filter driver (e.g., active restore driver) responsible for putting the operating system into the application-consistent mode and continue booting into the operating system. Replication application 109 and the file system driver may start active restore mode, which may ensure that critical OS files are loaded (604). The critical OS files may be located in the versions storage (605). The replica machine (e.g., virtual target machine 103 or physical target machine 202) may boot into the operating system with active restore drive running. The active restore driver may generate or use a bitmap of sectors stored on in replica storage and may become a transparent filter for access to those sectors.

The difference between option 1 (most recent replica version) and option 2 (previous replica version in application-consistent mode) is that the option 1 may be crash-consistent and instruct the replica machine to boot all sectors that are stored on the hard drive of the replica machine. Option 2 may be an application-consistent version and may instruct the replica machine to boot from a backup stored on versions storage.

There may be two ways to boot the replica machine from the backup. The first is to start the recovery and continue until it is finished. The second is to use Active Restore Technology (e.g., by Acronis) that may allow the replica machine to boot an operating system almost directly from backup. When booting from backup using Active Restore Technology, only boot-critical OS files may be restored first so that the system can be used. The sectors of the critical OS files from versions storage may be loaded and written (606) to the replica machine file system and the machine may start booting (607) into the OS.

Replication application 109 and/or the file system driver may inject (608) the active restore driver into the OS before it is loaded. The restore continues in the background while the system is available to the user. Using a transparent filter enables a portion of data that is not yet restored to the replica machine's file system to be accessed by the user or OS, as the access attempt may be redirected to the backup and the data may be taken from backup and written to the machine's file system out-of-order.

In an implementation, Active Restore Technology (e.g., from Acronis) may be used. Typically, when an image of an OS is restored, it may take hours to restore because the OS may boot up only when all files are finally restored. Active Restore technology may be aware of what files are critical for the OS to boot up, and may restores only those files and immediately boots up, which may take minutes rather than hours. A special active restore driver may be injected into the operating system (OS) and restore of other disk sectors may continue in the background. If a file is requested by the OS or user before that file is completely restored, the file is put into an out-of-order pool and may be restored out-of-order.

The active restore driver may operate as a transparent filter between the OS file system and the versions storage as a result of it permitting selective or filtered file access as needed. The active restore driver may start loading (609) sectors of the requested version from versions storage one-by-one, to the replica machine file system by the same offset as on the source machine. These sectors may be put into the file system on the replica machine ((e.g., virtual target machine 103 or physical target machine 202) and may replace the existing content.

If an operating system or application attempts (610) to access a sector from the bitmap of sectors stored on the replica storage which is not yet fully located on the replica machine file system, the active restore driver may intercept the request and load (611) this sector from the replica storage out-of-order and replaces the sector on the replica machine file system with it.

Replication application 109 may determine (612) if all sectors from the replica storage have been written to the sectors corresponding them on the file system of the replica machine. If so, the OS may be completely booted (613) to the state of the requested application-consistent point-in-time version. The OS may be ready may no longer needs the active restore driver's intercession. The active restore driver may be removed (614) from the OS.

In an implementation Universal Restore (e.g., from Acronis) may be used. Universal Restore technology may allow the user to provide the new drivers that will be automatically injected to the restored/replicated image of the replica machine before the first boot of the OS. Typically, when booting one machine's image/replica on another machine with different hardware, the boot may fail because the image/replica may lack drivers necessary for the hardware on the second machine.

In an embodiment, a system for machine replication may have a source machine up and running on a target machine almost immediately after failure on the source machine. The system may include a source machine's OS with a file system filter driver installed and responsible for tracking file system changes. The source machine may be replicated to the target machine in sector-to-sector mode. The replication may performed continuously from the source machine to the target machine, and the appropriate file drivers may be used so that a replication application can start collecting all sectors one-by-one from the source machine's disks and transfer the data from the sectors to the replica machine.

The source machine may be replicated in application-consistent mode such that the sectors are applied one-by-one at the target machine by the same offset as on the source machine. When a replication is in progress in live replication mode, the replication application may initiate an operation to create a version in application-consistent mode. A replication driver on the source machine may initiate a VSS snapshot and waits until all application VSS writers report that the required application data is in the snapshot. After the snapshot is created and the replication application confirms, the replication application may makes confirm that all information from the source machine hard disk is transferred to the replica machine and replica machine state may be changed to application-consistent version.

The OS of the target machine may be patched with drivers that integrate the new target hardware with the target machine. In some situations, the source machine and the target machine may be different in terms of hardware. In other copying the source operating system to the target machine hardware may not work and the target machine may not boot. The appropriate drivers for NIC, HDD, and/or RAID (if any), etc. may need to be installed at the target machine. If a portion of data sent to the target machine is absolutely new, it may be applied on the replica machine directly to its file system. If a portion of data sent to the target machine attempts to overwrite a non-empty sector, the target machine's driver may send the transferred portion of data to a dedicated buffer. Information from the non-empty sector may be saved to version.

After the data from the non-empty sector is saved to version storage as a part of the previous version, the portion of data sent from the source machine may be written to the replica machine's file system. When all sectors from the source machine are transferred to the target machine, the drivers required for the operating system to boot may become integrated into the OS of target machine. If source machine fails then the target machine may immediately boot.

The target machine may boot into the operating system with the active restore driver running. The active restore drive may take a bitmap of sectors stored on the replica storage and may becomes a transparent filter for access to those sectors. The active restore driver may start loading sectors from storage one-by-one. These sectors may be put into the file system on the replica machine and may replace their content. If an operating system or an application attempts to access a sector from the bitmap of sectors stored on the replica storage, the active restore driver may load this sector from the storage out-of-order and replaces the one on the file system with that sector. After all sectors stored on the replica storage are written to the corresponding sectors on the file system of the replica machine, the operating system may ready to run and may no longer need the active restore driver.

Exemplary Software and Hardware Related Implementations

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP. NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for machine replication comprising:
    creating a crash-consistent replica of a source machine by replicating sectors from a source drive on the source machine to a target drive on a target machine;
    in response to determining that a sector replicated from the source drive to the target drive has changed on the source drive, replicating the sector that changed on the source drive to the target drive on the target machine out-of-order;
    creating an application-consistent replica version of the source machine by creating a snapshot of the source machine and replicating sectors from the snapshot to the target drive on the target machine; and
    in response to determining that a sector from the source drive on the source machine changed after the snapshot was created, replicating the sector that changed on the source drive on the source machine after the snapshot was created to the target drive on the target machine out-of-order;
    generating a marker code indicating that all sectors of the source drive on the source machine have been replicated from the source drive to the target drive of the target machine; and
    transmitting the marker code to the target machine.

2. The method of claim 1, further comprising:
    integrating one or more hardware drivers at the target machine wherein the one or more hardware drivers correspond to hardware used by the target machine to boot at least one of: the crash-consistent replica and the application consistent replica version of the source machine.

3. The method of claim 1, further comprising:
continuously replicating the source drive of the source machine to the target drive of the target machine in a sector-by-sector mode.

4. The method of claim 1, further comprising:
establishing a heartbeat signal between the source machine and the target machine; and
in response to determining that the heartbeat signal timed-out, re-creating the crash-consistent replica of the source machine.

5. The method of claim 1, further comprising:
receiving an indication to boot at least one of: the crash-consistent replica and the application consistent replica version of the source machine at the target machine.

6. The method of claim 1, wherein the sectors on the target drive have the same offset as the sectors on the source drive.

7. A computer program product residing on a non-transitory computer readable storage medium having a plurality of instructions stored thereon, which, when executed by a processor, cause the processor to perform operations for machine replication, the operations comprising:
creating a crash-consistent replica of a source machine by replicating sectors from a source drive on the source machine to a target drive on a target machine;
in response to determining that a sector replicated from the source drive to the target drive has changed on the source drive, replicating the sector that changed on the source drive to the target drive on the target machine out-of-order;
creating an application-consistent replica version of the source machine by creating a snapshot of the source machine and replicating sectors from the snapshot to the target drive on the target machine;
in response to determining that a sector from the source drive on the source machine changed after the snapshot was created, replicating the sector that changed on the source drive on the source machine after the snapshot was created to the target drive on the target machine out-of-order;
generating a marker code indicating that all sectors of the source drive on the source machine have been replicated from the source drive to the target drive of the target machine; and
transmitting the marker code to the target machine.

8. The computer program product of claim 7, wherein the operations further comprise:
integrating one or more hardware drivers at the target machine wherein the one or more hardware drivers correspond to hardware used by the target machine to boot at least one of: the crash-consistent replica and the application consistent replica version of the source machine.

9. The computer program product of claim 7, wherein the operations further comprise:
continuously replicating the source drive of the source machine to the target drive of the target machine in a sector-by-sector mode.

10. The computer program product of claim 7, wherein the operations further comprise:
establishing a heartbeat signal between the source machine and the target machine; and
in response to determining that the heartbeat signal timed-out, re-creating the crash-consistent replica of the source machine.

11. The computer program product of claim 7, wherein the operations further comprise:
receiving an indication to boot at least one of: the crash-consistent replica and the application consistent replica version of the source machine at the target machine.

12. The computer program product of claim 7, wherein the sectors on the target drive have the same offset as the sectors on the source drive.

13. A computing system for machine replication, the computing system comprising one or more processors, wherein the one or more processors are configured to:
create a crash-consistent replica of a source machine by replicating sectors from a source drive on the source machine to a target drive on a target machine;
in response to determining that a sector replicated from the source drive to the target drive has changed or that the sector will be changed in response to a write request on the source drive, replicate content of the sector on the source drive to the target drive on the target machine out-of-order; and
create an application-consistent replica version of the source machine by creating a snapshot of the source machine and replicating sectors from the snapshot to the target drive on the target machine;
establish a heartbeat signal between the source machine and the target machine; and
in response to determining that the heartbeat signal timed-out, re-create the crash-consistent replica of the source machine.

14. The computing system of claim 13, wherein the one or more processors are further configured to:
in response to determining that a sector from the source drive on the source machine changed after the snapshot was created, replicate the sector that changed on the source drive on the source machine after the snapshot was created to the target drive on the target machine out-of-order.

15. The computing system of claim 13, wherein the one or more processors are further configured to:
integrate one or more hardware drivers at the target machine wherein the one or more hardware drivers correspond to hardware used by the target machine to boot at least one of: the crash-consistent replica and the application consistent replica version of the source machine.

16. The computing system of claim 13, wherein the one or more processors are further configured to:
generate a marker code indicating that all sectors of the source drive on the source machine have been replicated from source drive to the target drive of the target machine and transmitting the marker code to the target machine.

17. The computing system of claim 13, wherein the one or more processors are further configured to:
continuously replicate the source drive of the source machine to the target drive of the target machine in a sector-by-sector mode.

18. The computing system of claim 13, wherein the one or more processors are further configured to:
receive an indication to boot at least one of: the crash-consistent replica and the application consistent replica version of the source machine at the target machine.

19. The computing system of claim 13, wherein the sectors on the target drive have the same offset as the sectors on the source drive.

20. A system comprising:
- a source machine including a source drive, the source machine running an application;
- a target machine including a target drive; and
- a computing device running a replication application for replicating sectors from the source drive on the source machine to the target drive on the target machine, wherein the sectors on the target drive have the same offset as the sectors on the source drive, wherein the replication application is configured to generate a marker code indicating that all sectors of the source drive on the source machine have been replicated from the source drive to the target drive of the target machine and transmitting the marker code to the target machine.

* * * * *